United States Patent Office 3,203,857
Patented Aug. 31, 1965

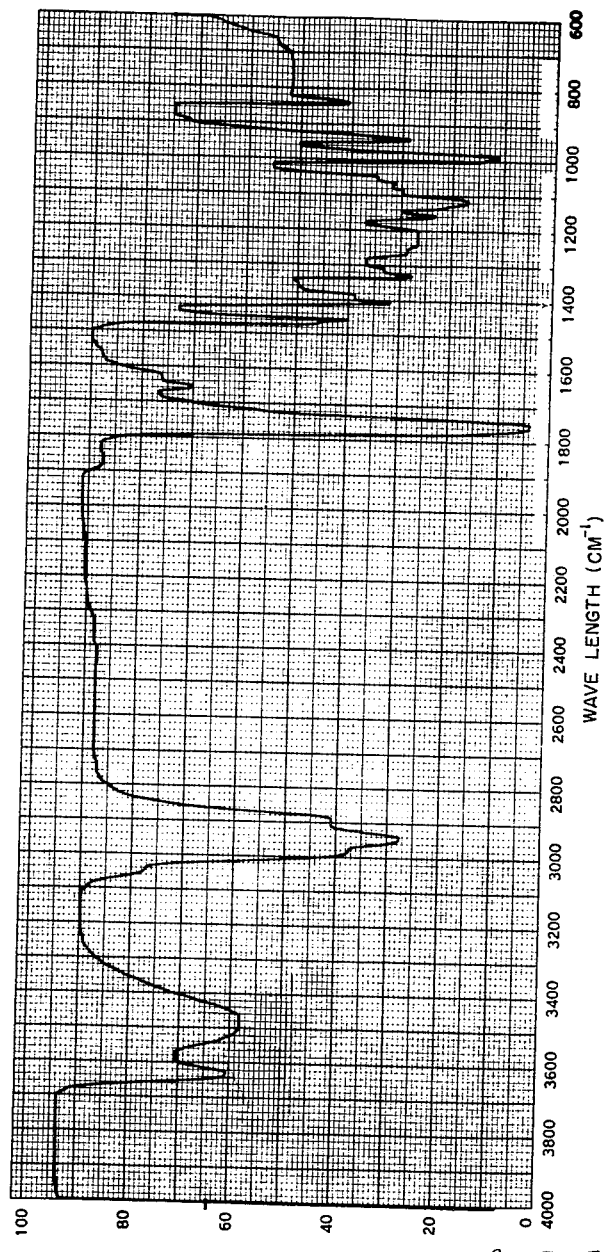

3,203,857
ANALGESIC COMPOSITIONS COMPRISING A LACTONE OBTAINED FROM HELENIUM
Robert Armistead Lucas, Mendham, and Harold Belding MacPhillamy, Madison, N.J., assignors to Ciba Corporation, New York, N.Y., a corporation of Delaware
Filed Jan. 18, 1963, Ser. No. 252,392
5 Claims. (Cl. 167—55)

The present invention concerns a new crystalline compound, hereinafter identfied as Su-12334, having analgesic effects, which are not antagonized by nalorphine; the compound of this invention, having a low degree of toxicity and thus a satisfactory margin of safety, can, therefore, be used to alleviate pain without causing undesired side effects.

We have found, that the pure and crystalline compound Su-12334 of this invention can be isolated from the plant material of certain plants of the family Compositae, particularly from plant material of plants of the genus Helenium, such as *Helenium amarum* or other related species. Unlike the plant material itself, the new crystalline compound is useful for purposes, for which the plant material or a crude extract thereof is not available. For example, the dosage of the active material in its pure and crystalline form can be determined exactly, whereas the active ingredient of the whole plant material, as well as that of a crude extract prepared from the latter, varies and depends on natural factors beyond control. Furthermore, in the case of an analgesic compound, it is of the utmost importance that it can be given parenterally in order to obtain a fast relief from pain. However, whole plant materials or crude extracts prepared from the latter cannot be given by this route due to the presence of insoluble constituents and/or toxic principles. Contrary thereto, a pure and crystalline compound, such as compound Su-12334 of this invention, can be dissolved in a suitable vehicle and used for parenteral administration.

The crystalline Su-12334 of this invention is composed exclusively of carbon, hydrogen and oxygen, and analyzes as follows:

| Sample | Carbon (percent) | Hydrogen (percent) | Melting point* | $[\alpha]_D^{25}$† |
|---|---|---|---|---|
| Sublimed | 67.98 | 7.64 | 185–186° | |
| Recrystallized from benzene | 68.71 | 7.85 | 197–198° | +3.4° |
| Recrystallized from ethyl acetate | 67.73 | 7.65 | 197–198° | +6.9° |
| Recrystallized | 68.48 | 7.40 | 197–198° | |

*Taken in open capillary tube, uncorrected.
†Taken in chloroform.

The molecular weight of Su-12334 as determined by mass spectroscopy using the analytical sample recrystallized from benzene, is 264, and as determined on the same sample by single crystal X-ray diffraction is 268 ($\pm 2$ percent), and its empirical formula is $C_{15}H_{20}O_4$. The crystalline system of the benzene recrystallized material is monoclinic; the space group is $P2_1$; the number of asymmetric units per unit cell is $Z=2$; and the unit cell dimensions are as follows: $a=10.02$ A.; $b=6.73$ A.; $c=10.42$ A.; and $\beta=99°$.

Su-12334 absorbs the ultraviolet light only in the end absorption region; the infrared absorption spectrum of the sublimed analytical sample taken in chloroform and expressed in cm.$^{-1}$ shows the following bands (see figure): strong bands at 1756 (broad), 990, 940 and 840; medium bands at 3630, 3489, 1460, 1410, 1385, 1330, 1160 and 1120; weak bands at 1663, 1090, 1070 and 875; and shoulders at 1630, 1470, 1310, 1260, 1050, 995 and 900.

The $R_f$-value of the sample of Su-12334 recrystallized from benzene as determined on paper (Whatman No. 1), impregnated with a 1:1-mixture of formamide (adjusted to pH 5.6 with benzoic acid) and methanol, and using as the mobile phase a 1:1-mixture of xylene and methyl ethyl ketone, is 0.35 to 0.5.

The compound Su-12334 shows the following solubility pattern: very soluble in chloroform and methylene chloride, soluble in benzene, ethyl acetate and pyridine, fairly soluble in methanol, sparingly soluble in diethyl ether and water, and virtually insoluble in hexane or petroleum ether.

Taking into account all the data obtained from the various physico-chemical measurements, particularly from the nuclear magnetic resonance spectrum, Su-12334 has the structure of the following formula

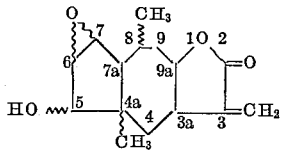

i.e. Su-12334 is 5-hydroxy-4a,8-dimethyl-3-methylene-6,7-oxido-2-oxo-2,3,3a,4,4a,5,6,7,7a,8,9,9a-dodecahydro-azuleno[6,5-b]furan with a molecular weight of 264.31 for the empirical formula $C_{15}H_{20}O_4$.

The following data are taken from the nuclear magnetic resonance absorption curve of Su-12334 (sublimed sample), produced on an analytical NMR A60 spectrometer, using a solution of 0.02 g. of the crystalline Su-12334 in 0.2 ml. of deuterated chloroform, and tetramethylsilane (TMS) as the internal reference expressed as $\delta=0$ p.p.m. (parts per million): hydrogens of methylene group at 3-position: doublet with $\delta=5.43$ p.p.m. and $J=3.1$ c.p.s. (cycles per second), and doublet with $=6.15$ p.p.m. and $J=3.3$; hydrogens of methyl group at 4a-position: singlet with $\delta=1.13$ p.p.m.: hydrogen of hydroxyl group at 5-position: doublet with $\delta=2.57$ p.p.m. and $J=5.3$ c.p.s. (disappears after deuteration); hydrogen at 5-position: doublet with $\delta=3.75$ p.p.m. and $J=5.4$ c.p.s. (disappears after deuteration); hydrogens at 6-position and 7-position: doublet+doublet with $\delta=3.38$ p.p.m. and $J$ less than 1 c.p.s.; hydrogens of methyl group at 8-position: doublet with $\delta=1.23$ p.p.m. and $J=5.4$ c.p.s.; and hydrogen at 9a-position: triplet+doublet with $\delta=4.30$ p.p.m. and $J$ for triplet 10 c.p.s.

The compound Su-12334 of this invention can be isolated according to per se conventional separation methods useful for the separation of Su-12334 from the other constituents of the plant material, such as extraction, distribution between immiscible or only partially miscible solvents of different polarities, different methods of chromatography, such as adsorption chromatography, distribution chromatography, paper chromatography, thin-layer chromatography and the like, or any other suitable method. The two latter chromatographic methods are primarily used for continuous observation of the preparative separation methods.

The above methods may be used in various combinations, whereby the selection of the specific method is determined by the previously-described properties of the new substance and its behaviour in different separating operations.

It is advantageous to isolate the Su-12334 from a crude extract prepared from the above-described plant material (especially from *Helenium amarum*). If desired, the plant material, preferably ground material from every part of the plant, including roots, stems and leaves, may be treated with a suitable lipoid solvent, e.g. petroleum ether, hexane and the like, to remove any fatty material. The crude extract is prepared by treating the crude or pretreated plant material with a suitable organic solvent, preferably with a water-miscible solvent, if necessary, at an elevated temperature. Alcohols, particularly lower alkanols, e.g. methanol and the like, are the solvents of choice for preparing the crude extract; these solvents may also be used in admixture with water. The root material after having been treated with the organic solvent, may be extracted with another suitable solvent, especially with water, and the resulting crude extracts are then combined for further processing; if desired, the extract may be freed from any remaining substances that are easily soluble in water-immiscible lipoid solvents, e.g. petroleum ether, hexane and the like, by extracting it with such solvent. Usually the solvents of the crude extract are evaporated either totally or partially, the latter in case the extract has been prepared with the help of water or a mixture of an organic solvent and water.

The isolation of the new compound Su-12334 from the crude extract or the aqueous mixture thereof can be performed in various ways.

A preferred method comprises separation by subjecting the crude extract to countercurrent distribution, for example, between water or an aqueous solvent mixture and a water-immiscible or sparingly water-miscible solvent or solvent mixture, particularly n-butanol and the like. This partition may be carried out, for example, by using an aqueous mixture of the crude extract, such as the aqueous mixture thereof as prepared above, which, in addition, may contain some water-miscible solvent, e.g. methanol and the like, and extracting it with the water-immiscible solvent, e.g. n-butanol and the like, washing the organic phase with fresh water and the aqueous phase with a fresh batch of the water-immiscible solvent; the water-washing is then extracted with the organic solvent washing, and the parent organic phase is combined with the organic solvent washing for further processing. If desired, this solvent transfer operation may be repeated several times, whereby after each transfer the same solvent system may be retained or replaced by another one. The solvents of the resulting extract may be removed by distillation (preferably under reduced pressure), lyophylization or any other suitable means.

From the resulting purified extract, Su-12334 may be obtained according to known methods, if necessary after further separation, e.g. fractional crystallization, adsorption on a suitable adsorbent material, e.g. aluminum oxide, silica gel, a diatomaceous earth, paper and the like, and fractional elution, or any other suitable preparative method.

Preferably, the purified extract obtained from a countercurrent distribution procedure is treated with a sparingly water-miscible organic solvent, in which the desired compound is soluble, e.g. benzene and the like. The insoluble material is then removed, for example, by filtration, centrifugation and the like, and the resulting solvent soluble fraction is either directly processed to yield the desired compound, for example, by removing the solvent and crystallizing the residue, or is further purified by appropriate separating procedures. For example, the resulting solution may be subjected to a chromatographic procedure. Thus, it may be treated with an adsorbent, or it may be evaporated, and the residue is taken up in a suitable solvent and is then subjected to the treatment with a suitable adsorbent material. The latter is primarily aluminum oxide, but may also be silica gel and the like. The desired compound is preferably eluted with a halogenated hydrocarbon solvent, such as methylene chloride and the like. The fractions containing the desired compound are identified by paper chromatography, thin-layer chromatography, or any other suitable analytical method.

The above isolation methods may be repeated and/or combined as desired.

After having removed the solvents from the fractions containing the desired Su-12334, the latter is isolated by crystallization, advantageously from benzene and ethyl acetate, as well as diethyl ether or a mixture of acetone and water and the like, and purified by recrystallization from the same or different solvents, if necessary after further treatment with an adsorbent, e.g. charcoal and the like.

Also included within the scope of this invention are the O-acyl-compounds of Su-12334, having the following structure

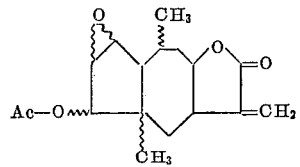

in which Ac is the acyl group of an organic acid, having preferably from one to twenty carbon atoms, particularly of an organic carboxylic acid, as well as an organic sulfonic acid.

The acyl group, represented by Ac in the above formula, is, for example, the acyl radical of an aliphatic carboxylic acid, particularly of a lower alkanoic acid, e.g. acetic, propionic, butyric, pivalic, 2,2-dimethyl-butyric acid and the like, as well as a cycloalkane carboxylic acid, in which cycloalkane has from five to seven ring carbon atoms, e.g. hexahydrobenzoic acid and the like, a cycloalkyl-lower alkanoic acid, in which cycloalkyl has from three to seven, particularly from five to seven, ring carbon atoms, e.g. cyclohexylacetic, β-cyclopentylpropionic acid and the like; acyl may also be the acyl radical of a carbocyclic aryl carboxylic acid, such as benzoic, a (lower alkoxy)-benzoic acid, e.g. 3,4,5-trimethoxybenzoic acid, and the like, of a carboxylic aryl-aliphatic carboxylic acid, e.g. cinnamic, 3,4,5-trimethoxy-cinnamic acid and the like, a heterocyclic aryl carboxylic acid, e.g. nicotinic, isonicotinic acid and the like, or any other suitable organic carboxylic acid. The acyl group may also stand for the acyl radical of an organic sulfonic acid, e.g. methane sulfonic, ethane sulfonic, benzene sulfonic, p-toluene sulfonic acid and the like.

The O-acyl-compounds of Su-12334 are prepared by converting in Su-12334 the free hydroxyl group into an acyloxy group.

The acylation reaction is carried out according to known methods, for example, by treating Su-12334 with an organic acid halide, e.g. chloride and the like, such as an organic carboxylic acid halide, for example, a lower alkanoic acid halide, e.g. acetyl chloride, propionic acid chloride, pivalic acid chloride and the like, as well as an organic sulfonic acid halide, e.g. chloride and the like, such as a carbocyclic aryl sulfonic acid halide, e.g. p-toluene sulfonic acid chloride and the like, or an aliphatic sulfonic acid halide, e.g. methane sulfonic acid chloride and the like. Preferably the acylation reaction with an organic acid halide is carried out in the presence of a suitable base, e.g. pyridine and the like. It may also be performed by treating the starting material with an organic acid anhydride, such as an organic carboxylic acid anhydride, for example, a lower alkanoic acid anhydride, e.g. acetic acid anhydride, propionic acid anhydride and the like, also preferably in the presence of a base, e.g. pyridine and the like. The esters with organic acids may also be obtained by treatment of the starting material with a ketene compound, e.g. ketene, or a substituted ketene.

The O-acyl-compounds of Su-12334, such as those in which acyl is the radical of an organic carboxylic acid, particularly the O-lower alkanoyl-compounds of Su-12334, also have analgesic properties and can be used accordingly to alleviate pain. Furthermore, they are useful as intermediates, for example, in the characterization or purification of Su-12334; for example, in order to obtain the latter in a very pure state, it may be converted into one of the O-acyl compounds which may then be purified separately and reconverted into the free Su-12334 by hydrolysis, for example, by treatment with a suitable base.

The following examples are intended to illustrate the invention and are not to be construed as being limitations thereon. Temperatures are given in degrees centigrade.

Example 1

A batch of 300 g. of ground plant material, including roots, stems and leaves, is extracted twice with about 800 ml. each of hot methanol, and once with about 800 ml. of hot water; the two extracts are combined and concentrated to a volume of about 100 ml. The resulting solution is extracted with 100 ml. of n-butanol; the organic phase is washed with 50 ml. of water, and the aqueous phase is washed with 50 ml. of n-butanol. The organic washing is washed with the water washing and combined with the original n-butanol phase, and the combined organic solutions are partially evaporated under reduced pressure and then freeze-dried under reduced pressure; weight: 25 g.

The resulting residue is taken up in 100 ml. of hot benzene; the insoluble material is filtered off (weight: 10 g.) and extracted with another 100 ml. of hot benzene. The insoluble material is discarded (weight: 4.9 g.), and the two remaining benzene solutions are individually concentrated to a volume of about 50 ml.; the insoluble material (1.3 g. from the first benzene extraction and 3.7 g. of the second benzene extraction) is filtered off, and the two filtrates are combined and taken to dryness; weight: 15 g.

A solution of the benzene-soluble material in benzene is placed onto a column containing 450 g. of aluminum oxide (Woelm, neutral, Grade II–III) and eluted as follows:

| Fractions | Solvent | Amount (in ml.) | Yield (in g.) | State |
|---|---|---|---|---|
| 1 | Benzene | 400 | 0.88 | Oily. |
| 2 | ----do---- | 400 | 0.26 | Do. |
| 3 | ----do---- | 400 | 0.35 | Semi-solid. |
| 4 | ----do---- | 400 | 0.26 | Do. |
| 5 | ----do---- | 400 | 0.18 | Do. |
| 6 | ----do---- | 400 | 0.23 | Do. |
| 7 | ----do---- | 400 | 0.14 | Do. |
| 8 | ----do---- | 400 | 0.055 | Do. |
| 9 | 1:1-mixture of benzene and methylene chloride. | 400 | 0.045 | Do. |
| 10 | ----do---- | 400 | 0.055 | Do. |
| 11 | Methylene chloride | 400 | 0.09 | Oily. |
| 12 | ----do---- | 400 | 0.26 | Do. |
| 13 | ----do---- | 800 | 0.42 | Do. |
| 14 | ----do---- | 400 | 0.19 | Do. |
| 15 | ----do---- | 1,600 | 0.95 | Cryst. |
| 16 | ----do---- | 1,600 | 0.45 | Do. |
| 17 | ----do---- | 800 | 0.05 | Do. |
| 18 | Methylene chloride containing 1 percent methanol. | 800 | 0.32 | Do. |
| 19 | ----do---- | 800 | 0.09 | Do. |
| 20 | Methanol | 700 | 0.77 | Frothy. |

Fractions 15 to 17 are combined and evaporated to dryness under reduced pressure, and the residue is crystallized from diethyl ether; the semi-crystalline material, M.P. 189–194° (weight: 0.19 g.) is recrystallized from benzene to yield the pure Su-12334, which melts at 197–198°, and has the structure of the following formula

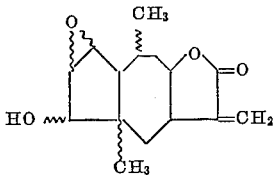

Example 2

A batch of 3200 g. of ground, whole plant material is extracted twice with about 8000 ml. of hot methanol, and once with about 8000 ml. of hot water; the two extracts are combined and concentrated under reduced pressure to a volume of about 1000 ml. The resulting extract is partitioned as described in Example 1, using 1000 ml. of n-butanol; each phase is washed with 500 ml. of fresh solvent. The organic phases are comibned partially evaporated under reduced pressure and freeze-dried under reduced pressure to yield 236 g. of an extract, of which 100 g. is taken up in 400 ml. of boiling benzene. The benzene-insoluble fraction (weight: 27 g.) is discarded; the benzene soluble fraction (weight: about 70 g.) is chromatographed on a column of 1350 g. of aluminum oxide (Woelm, Grade II–III, neutral) using benzene as the solvent. The chromatogram is developed as follows:

| Fraction | Solvent | Volume (in ml.) | Yield (in g.) | State |
|---|---|---|---|---|
| 1 | Benzene | 10,000 | 11.0 | Oily. |
| 2 | 1:1-mixture of benzene and methylene chloride. | 9,000 | 2.1 | Do. |
| 3 | Methylene chloride | 6,000 | 1.8 | Do. |
| 4 | ----do---- | 2,000 | 1.0 | Do. |
| 5 | ----do---- | 4,000 | 1.1 | Cryst. |
| 6 | ----do---- | 4,000 | 1.4 | Do. |
| 7 | ----do---- | 2,000 | 0.7 | Do. |
| 8 | ----do---- | 2,000 | 0.5 | Oily. |
| 9 | Methylene chloride containing 1 percent methanol. | 2,000 | 2.4 | Do. |
| 10 | Methanol | 3,000 | 3.7 | Do. |
| 11 | Water | 5,000 | 16.0 | Lyophylized. |

Fractions 5 to 7 are combined and crystallized from benzene to yield 1.14 g. of the pure Su-12334, M.P. 197–198°, which is identical with the material obtained according to the precedure of Example 1.

Example 3

A solution of 0.1 g. of the crystalline Su-12334 in 0.6 ml. of pyridine is treated with 0.4 ml. of acetic acid anhydride. After standing at room temperature overnight, the clear solution is diluted with 10 ml. of ice-water; upon standing white crystalline needles precipitate. They are filtered off, washed with water and dried to yield 0.09 g. of the O-acetyl-compound of Su-12334, which is recrystallized from a mixture of cyclohexane and methylene chloride, M.P. 140–142°. It analyzes as follows: calcd. for $C_{17}H_{22}O_5$ (306.35): C, 66.65; H, 7.24; found: C, 66.84; H, 7.38, and has the structure of the following formula

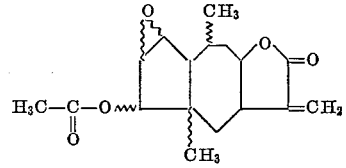

Other O-acyl-compounds of Su-12334, such as the O-propionyl-compound of Su-12334, the O-pivalyl-compound of Su-12334, the O-benzoyl-compound of Su-12334, the O-nicotinoyl-compound of Su-12334, the O-methylsulfonyl compound of Su-12334 and the like, having the structure of the following formula:

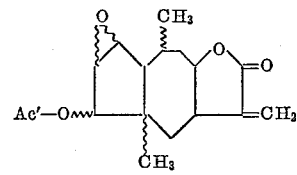

in which Ac' is propionyl, pivalyl, benzoyl, nicotinoyl and methylsulfonyl, respectively, are prepared by acylation according to the procedure of this invention.

Example 4

Also included within the scope of this invention are new analgesic compositions, which consist essentially of an effective amount of Su-12334 or an O-acyl-compound thereof, for example, an O-lower alkanoyl-compound of Su-12334, such as the O-acetyl compound of Su-12334 and the like, as the active analgesic ingredient, together with a carrier.

Preferred compositions for the alleviation of pain are those which consist essentially of an effective amount of Su-12334 as the active analgesic ingredient, together with an inert carrier.

The compositions are prepared by combining the active ingredient with a pharmaceutically acceptable organic or inorganic carrier in specified proportions. The compositions of this invention may be made up to contain from about 1 percent to about 50 percent, preferably from about 10 to about 50 percent, by weight, of the active analgesic ingredient.

Tablets, capsules, dragees and the like, represent the forms for oral administration. These orally applicable compositions may be compounded to have per single dosage unit from about 0.025 g. to about 0.2 g., especially from about 0.025 g. to about 0.075 g., of the active analgesic ingredient.

Apart from the active ingredient, the orally applicable preparations may contain substances commonly employed in the pharmectuical art for preparing dosage unit compositions. These may include excipients, binders, fillers, stabilizers or any other suitable ingredients. Examples of such carrier materials are starch, e.g. corn starch and the like, sugars, e.g. lactose, sucrose and the like, stearic acid, magnesium stearate, aluminum magnesium silicate preparations, talcum, tragacanth, acacia, polyethylene glycol and the like. The quantities of these ingredients may vary widely and depend, to some degree, upon the physical appearance (softness and the like) and size of the desired composition. Encapsulation may also be effected using, if desired, the same excipients as those used for tablets. The compounding of the formulations is generally carried out in the manner normally employed in the art. Any compatible color, approval and certified under the provisions of the Federal Food, Drug and Cosmetic Law may be used for aethetic purposes or as a means of identification.

Special orally applicable compositions may also provide for a prolonged and sustained analgesic effect. For example, tablets, such as those described in U.S. Patent 2,887,438, may contain the active ingredient embedded in a waxy core (for prolonged absorption in the lower intestine), around which is compressed a granulated mixture of the active ingredient together with a carrier (for immediate absorption in the stomach). Capsules for maintaining prolonged analgesic effects may contain micro-pills which contain small amounts of the active ingredient covered with coats having different rates of degradation. These long-acting preparations are prepared according to known methods.

Other suitable pharmaceutical preparations which may be used for the treatment of alleviation of pain containing from about 1 percent to about 50 percent of the active analgesic ingredient are parenteral solutions, orally applicable elixirs and the like. These preparations are manufactured according to methods known in the pharmaceutical arts using appropriate carrier materials. Parenteral solutions contain of from about 0.01 g. per ml. to about 0.1 g. per ml., especially from about 0.01 g. per ml. to about 0.05 g. per ml. of the analgesic ingredient. In view of the fact that the compound Su-12334 is slightly water-soluble, water may be used as a solvent, preferably together with organic solvents, such as polyethylene glycol, N-N-dimethylacetamide and the like. Other ingredients, particularly stabilizers, such as, for example, antioxidants, e.g. thiourea, sodium sulfide, sodium metabisulfate, ascorbic acid, cysteine hydrochloride, sodium formaldehyde sulfoxylate and the like, monothioglycerol, thiosorbitol and the like, buffer combinations, such as, for example, acetic acid:sodium acetate, potassium phthalate: sodium hydroxide, potassium dihydrogen phosphate: di-sodium hydrogen phosphate, potassium dihydrogen phosphate:sodium hydroxide and the like, salts for making isotonic solutions, e.g. sodium chloride and the like, preservatives, e.g., benzyl alcohol and the like, are added to ensure stable solutions suitable for injection. It is desirable to maintaina pH of about 7 and any buffers yielding such pH may be utilized .

Tablets containing 0.05 g. of Su-12334 as the active ingredient may be prepared as follows (for 10,000 tablets):

| Ingredients: | G. |
|---|---|
| Su-12334 | 500.00 |
| Lactose, spray dried | 2288.00 |
| Cornstarch | [1]134.20 |
| Confectioners sugars | 60.90 |
| Magnesium stearate | 16.90 |
| Purified water, q.s. | |
| Alcohol 3A, 50 percent, q.s. | |

[1] Equivalent to 152.5 g. on a hydrous basis.

The compound Su-12334, the lactose, the confectioners sugar, the magnesium stearate and 87.5 g. of the corn starch are mixed in a suitable mixer. 65 g. of the corn starch is suspended in 70 ml. of water, and 280 ml. of water is added to form a paste, which is used to granulate the above mixture; granulation is completed by adding the 50 percent 3A alcohol, and the mass is passed through a No. 8 screen and dried at 49°. The granules are broken on a No. 12 screen and compressed into tablets weighing 0.3 g., using 11/32" punches and dies.

An injectable solution containing 0.025 g. of Su-12334 per ml. is prepared as follows (for 1000 ml.):

| Ingredients: | | |
|---|---|---|
| Su-12334 | g | 25.00 |
| N,N-dimethylacetamide | ml | 250.00 |
| Polyethylene glycol 300 | ml | 200.00 |
| Benzyl Alcohol | ml | 10.00 |
| Sodium Acetate | g | 6.50 |
| Acetic Acid | g | 19.00 |
| Water for injection, q.s. | ml | 1000.00 |

The compound Su-12334 is dissolved in the N,N-dimethylacetamide, and while constantly stirring, the polyethylene glycol 300 and the benzyl alcohol are added. The sodium acetate is dissolved in 100 ml. of water for injection, and is added to the Su-12334 solution. After thorough mixing, a solution of the acetic acid in 100 ml. of water is added, and stirring is contained until a clear solution is obtained. The volume is brought to 1000 ml. by adding water for injection; the solution is filtered through a medium porosity filter, filled into 2 ml. ampules and sealed. The ampules are sterilized for thirty minutes at 115° and under a pressure of about 0.7 atmosphere.

Also included within the scope of this invention is a method for the alleviation of pain, which comprises administering to a host requiring relief from pain a composition consisting esentially of an analgetically effective amount of Su-12334, as well as an O-acyl-compound of Su-12334, such as an O-lower alkanoyl-compound of Su-12334, e.g. O-acetyl-compound of Su-12334 and the like, as the active analgesic ingredient, together with a carrier.

What is claimed is:

1. An analgesic composition containing from about 1 percent to about 50 percent of a member selected from the group consisting of the compound identified as Su-12334 being composed entirely of carbon, hydrogen and oxygen, and having the empirical formula $C_{15}H_{20}O_4$, its sublimed form analyzing for 67.98 percent of carbon and 7.64 percent of hydrogen, melting at 185–186°, and its infrared absorption spectrum, taken in chloroform, showing the following bands expressed in cm.$^{-1}$: strong bands at 1756, 990, 940 and 840; medium bands at 3630, 3490, 1460, 1410, 1385, 1330, 1160 and 1120; weak bands at 1663, 1090, 1070 and 875; and shoulders at 1630, 1470, 1310, 1260, 1050, 995 and 900, and its benzene-recrystallized form melting at 197-198°, having a specific rotation in chloroform of $[\alpha]_D^{25}=+3.4°$, analyzing for 68.71 percent of carbon and 7.85 percent of hydrogen, having a molecular weight of 264 as determined by mass spectroscopy and of 268 (±2 percent) as determined by single crystal X-ray diffraction, having a monoclinic crystalline system with the space group $P2_1$, the number of asymmetric units per unit cell $Z=2$, and the unit cell dimensions $a=10.02$ A.; $b=6.73$ A.; A.; $c=10.42$ A.; and $\beta=99°$; and having an $Rf=0.35-0.5$ on Whatman No. 1 paper impregnated with a 1:1-mixture of formamide adjusted to ph 5.6 with benzoic acid, and methanol, and a mobile phase consisting of a 1:1-mixture of xylene and methyl ethyl ketone, and being very soluble in chloroform and methylene chloride, soluble in benzene, ethyl acetate and pyridine, fairly soluble in methanol, sparingly soluble in water and virtually insoluble in hexane and petroleum ether, and having the structure of the following formula

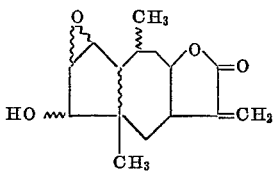

with a theoretical molecular weight of 264.31, and the O-acyl-compounds thereof said acyl group being derived from an acid having from 1 to 20 carbon atoms and selected from the group consisting of an organic carboxylic acid and an organic sulfonic acid, as the active analgesic ingredient together with a pharmaceutically acceptable carrier.

2. A single dosage unit composition for oral use consisting esentially of from about 0.25 g. to about 0.2 g. of a member selected from the group consisting of the compound identified as Su-12334 and characterized in claim 1, and the O-acyl-compounds thereof said acyl group being derived from an acid having from 1 to 20 carbon atoms and selected from the group consisting of an organic carboxylic acid and an organic sulfonic acid, as the active analgesic ingredient, together with a pharmaceutically acceptable carrier.

3. A single dosage unit composition for oral use consisting essentially of from about 0.25 g. to about 0.2 g. of the compound identified as Su-12334 and characterized in claim 1, as the active analgesic ingredient, together with a pharmaceutically acceptable carrier.

4. A composition for parental use consisting essentially of from about 0.01 g. per ml. to about 0.1 g. per ml. of a member selected from the group consisting of the compound identified as Su-12334 and characterized in claim 1, and the O-acyl-compounds thereof said acyl group being derived from an acid having from 1 to 20 carbon atoms and selected from the group consisting of an organic carboxylic acid and an organic sulfonic acid, as the active analgesic ingredient.

5. A composition for parenteral use consisting essentially of from about 0.01 g. per ml. to about 0.1 g. per ml. of the compound identified as Su-12334 and characterized in claim 1.

References Cited by the Examiner

UNITED STATES PATENTS

| | | | |
|---|---|---|---|
| 2,937,118 | 5/60 | Haxthausen | 167—65 |
| 3,050,532 | 8/62 | Schumacher | 260—343.3 |
| 3,063,902 | 11/62 | Gray | 167—65 |
| 3,101,347 | 8/63 | Lafont | 260—343.3 |

OTHER REFERENCES

Herout: Chemical Abstracts, volume 51, 1957, page 4970(d).

Sorm: Chemical Abstracts, volume 54, 1960, page 8893(d).

FRANK CACCIAPAGLIA, JR., *Primary Examiner.*

JULIAN S. LEVITT, *Examiner.*

UNITED STATES PATENT OFFICE
CERTIFICATE OF CORRECTION

Patent No. 3,203,857                                August 31, 1965

Robert Armistead Lucas et al.

It is hereby certified that error appears in the above numbered patent requiring correction and that the said Letters Patent should read as corrected below.

Column 9, line 13, for "a=10.02 A.; b=6.73 A.; A.; c=10.42 A.;" read -- a=10.02 A.; b=6.73 A.; c=10.42 A.; --; column 10, line 12, for "parental" read -- parenteral --.

Signed and sealed this 3rd day of May 1966.

(SEAL)
Attest:

ERNEST W. SWIDER                                    EDWARD J. BRENNER
Attesting Officer                                        Commissioner of Patents